R. VOSE.
Car Spring.

No. 34,657.

2 Sheets—Sheet 1.

Patented Mar. 11, 1862.

Witnesses:
Geo. A. C. Smith
Chas Hadaway

Inventor:
Richard Vose
By his atty
Z. C. Robbins

R. VOSE.
Car Spring.
No. 34,657.
2 Sheets—Sheet 2.
Patented Mar. 11, 1862.
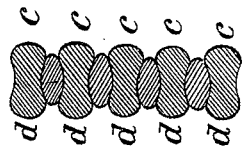
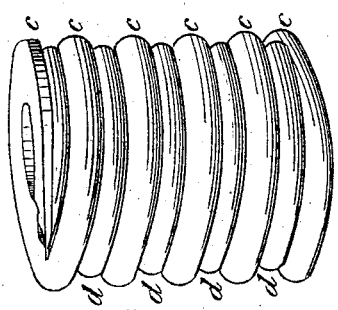
Witnesses:
Frederick W. Symons
R. Engle Jr.
Inventor:
Richard Vose
by his attorneys
Robbins & Burr

UNITED STATES PATENT OFFICE.

RICHARD VOSE, OF NEW YORK, N. Y.

IMPROVEMENT IN CAR-SPRINGS.

Specification forming part of Letters Patent No. 34,657, dated March 11, 1862.

*To all whom it may concern:*

Be it known that I, RICHARD VOSE, of the city, county, and State of New York, have invented a new and Improved Car-Spring; and I do hereby declare that the following is a full and exact description thereof, reference being had to the accompanying drawings, which form a part of this specification.

Figure 2:
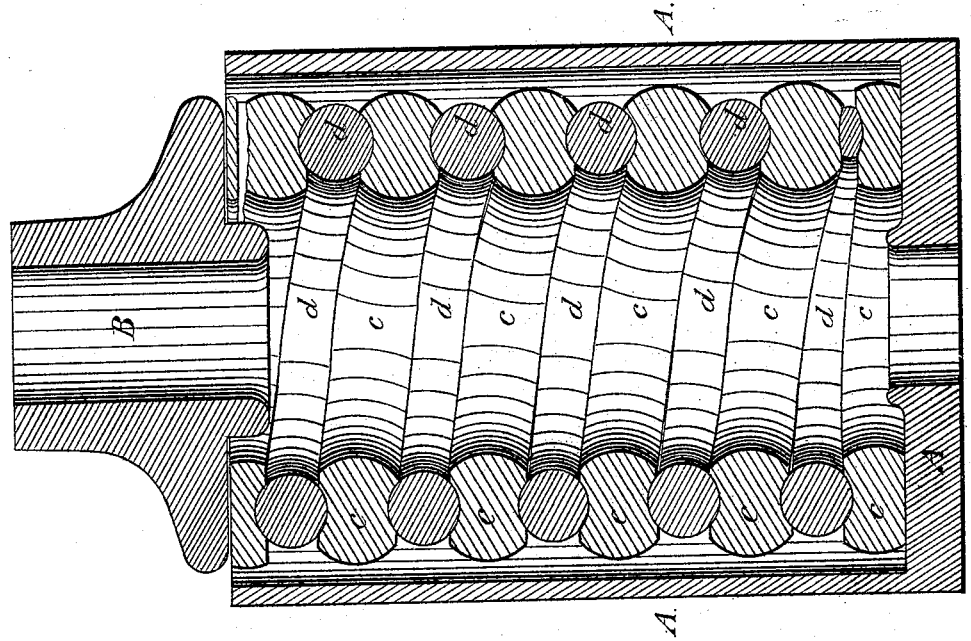
Figure 1:
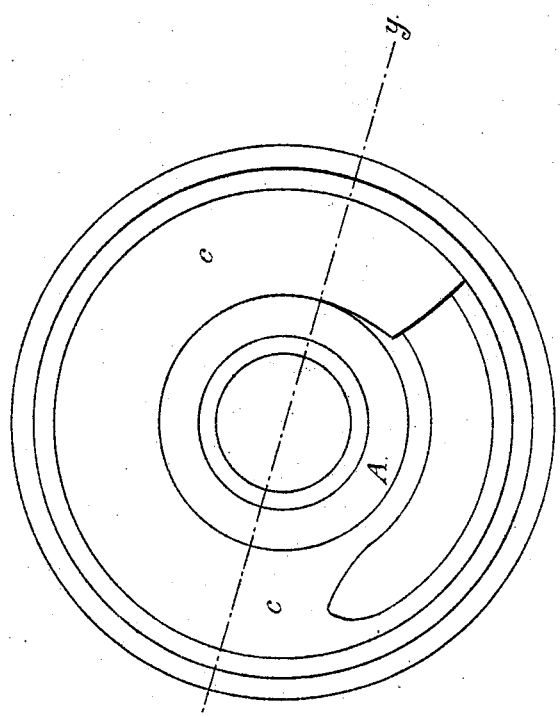

Figure 1 is a top view of said spring, minus the bearing-follower B of the casing; and Fig. 2 a section of the spring and its casing entire, in the line $y\ y$ of Fig. 1.

It is well known that helical springs of the usual construction are speedily destroyed when they are placed in positions where they are subjected to violent concussive strains, and this peculiarity of said springs has almost entirely excluded them from use in all railway vehicles; but I have found by experimental tests that helical or spiral springs can be made as durable and as reliable in any situation as any other character of springs by interposing some elastic, gummy, or fibrous substance between the coils of said helical or spiral springs, substantially in the manner represented in the accompanying drawings, and this improvement is the subject of my present application for Letters Patent.

The spring which is represented in the accompanying drawings is composed of two intertwined helical coils, one of said coils $c$ being composed of elastic metal, and the other $d$ being composed of vulcanized india-rubber, or vulcanized gutta-percha, or any other equivalent elastically-yielding substance, the upper and lower faces of the said metallic coil $c$ being made of a concave shape for the reception of the elastic coil $d$, substantially as represented in Fig. 2. The combination-spring thus produced may be placed in a cup-shaped box A, and be surmounted by a bearing-follower B, of the character represented in Fig. 2, or the said spring may be placed in any other form of casing that may be preferred.

Other methods of forming a compound helical or spiral spring, of a metallic coil combined with some suitable elastically-yielding substance, may be devised; but the one represented in the accompanying drawings is the one which at present I prefer.

From the experiments which I have made, I believe that one of my said improved combination-springs weighing less than twenty pounds will perfectly perform the duty of an elliptic spring of eighty pounds, and that in any situation in which it may be placed the durability of my improved combination-spring will not be inferior to that of the best elliptic spring.

What I claim as my invention, and desire to secure by Letters Patent, is—

An improved compound spring, produced by interposing a packing of elastic, gum, or the equivalent thereof between the coils of a spiral or a helical metallic spring, substantially in the manner herein set forth.

The above specification of my improved car-spring signed and witnessed.

RICHD. VOSE.

Witnesses:
C. D. GIBRON,
A. L. BUTLER.